United States Patent [19]
Hoffman et al.

[11] 3,822,939
[45] July 9, 1974

[54] METHOD FOR PHOTOGRAPHING A SET OF VARYING CONTRAST RADIOGRAPHIC X-RAYS

[76] Inventors: Stanley A. Hoffman, 4 Langdon Ln., Narberth, Pa. 19072; David J. Paxton, 168 S. HIghland, Springfield, Pa. 19064

[22] Filed: Mar. 30, 1971

[21] Appl. No.: 129,453

[52] U.S. Cl..................... 355/132, 355/28, 355/46, 355/64
[51] Int. Cl. .......................................... G03b 27/02
[58] Field of Search ........... 355/132, 77, 27, 28, 46, 355/64, 78, 65; 250/65 R

[56] References Cited
UNITED STATES PATENTS
3,289,530 12/1966 Samain ........................... 355/46 X
3,492,486 1/1970 Bischoff et al. .................. 250/65 R Primary Examiner—Richard L. Moss
Attorney, Agent, or Firm—Maleson, Kimmelman & Ratner

[57] ABSTRACT

A method for photographing a set of varying contrast radiographic X-rays for mounting within openings of an aperture card or within a transparent jacket. A set of radiographic X-rays are photographed with a microfilm camera. The film is processed through a succession of developing, fixation and water baths to provide a film negative transparency. The negative may be cut and mounted on the aperture card or inserted in the jacket or a positive transparency may be formed for mounting purposes. The positive transparency is formed by passing the negative through a contact printer and then processing the resulting positive film through a series of developing, fixation, and water baths. The positive transparency is then cut to proper size and mounted on the aperture card.

15 Claims, 1 Drawing Figure

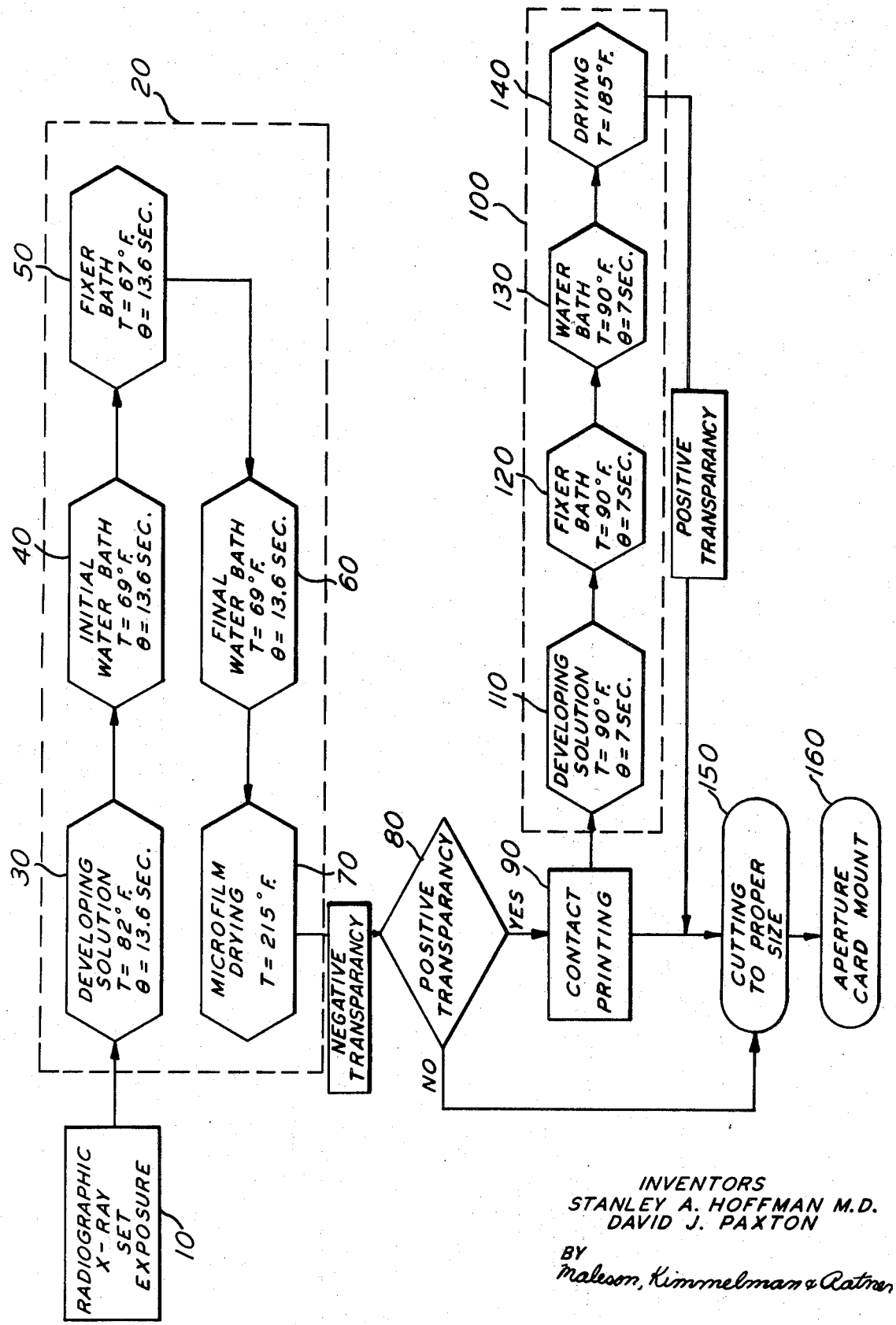

/* 3,822,939 */

METHOD FOR PHOTOGRAPHING A SET OF VARYING CONTRAST RADIOGRAPHIC X-RAYS

SUMMARY OF THE INVENTION

A method of photographing a set of radiographic X-rays with at least one of the X-rays having varying contrast with respect to the other X-rays to be viewed on one frame of an aperture card. The method includes the step of microfilming the set of radiographic X-rays at a predetermined single exposure setting to produce a radiographic X-ray microfilm. The microfilming includes photographing the set of radiographic X-rays in a predetermined reduced contour dimension on a photographic film for producing a set of radiographic X-ray images exposed thereon. After microfilming, the X-ray microfilms are positioned on the frame of the aperture card or within a transparent jacket.

BACKGROUND OF THE INVENTION

1. Field of the Invention

This invention relates to the field of photographing radiographic X-rays. In particular, this invention pertains to the field of methods in photographing sets of varying contrast radiographic X-rays and mounting such in aperture cards or transparent jackets.

2. Prior Art

Radiographic X-rays are used in great quantity in the day to day operation of hospitals and radiology departments. X-rays of this type are usually of large size, bulky, and combined with the vast number needed, provide an increasing problem in filing and ability to retrieve necessary data. While microfilming radiographic X-rays has become well known, previous methods permit only one X-ray per frame of a microfilm. The reason for this is that different X-ray images have different contrasts and known methods of microfilming could not accept more than one X-ray of varying contrast per frame. This, although prior systems of microfilming X-rays do increase the amount of X-rays that may be stored, the number of X-rays that may be mounted on a viewing (aperture) card is limited to the number of frames that fit within an aperture of the card.

When previous microfilming systems include only one X-ray per frame, all of one person's X-rays that are taken do not fit on a single viewing card for instant comparisons. The many cards required for each person's X-ray produces awesome problems in storing and retrieving the necessary X-ray data.

BRIEF DESCRIPTION OF THE DRAWING

The FIGURE is a block diagram presented in consecutive flow form of the method of photographing a set of varying contrast radiographic X-rays.

DESCRIPTION OF THE PREFERRED EMBODIMENT

Referring now to the FIGURE, there is shown a block or system flow description of the method associated with the photographing a set of radiographic X-rays with at least one of the X-rays having varying contrast with respect to others. With this method, a multiplicity of X-rays may be mounted on an aperture card and viewed.

The initial step in the method is in microfilming the set of radiographic X-rays at a predetermined single exposure setting to produce a radiographic X-ray microfilm as characterized by system blocks 10–70 of the figure. A first component step within the microfilming is the photographing of the radiographic X-rays in a predetermined reduced contour dimension. The radiographic X-ray set exposure or photography as established in block 10 is accomplished through incorporation of a standard microfilm camera to produce a set of negative image transparencies on a photographic film to be described more fully.

In this embodiment, an Itek microfilm camera, Model No. 3536 has been utilized to produce the necessary negative image transparencies. In operation, the X-ray set to be photographed is mounted on the microfilm camera. The camera model described permits the microfilm to be held securely in the exposure plane through use of a movable suction plate. The securing and control of the microfilm in a precise exposure plane through the vacuum suction plate optimizes the resolution during the exposure and minimizes the possibility of film abrasions when and if the film is to be advanced.

Illumination during this step is of maximum importance for success in photographing of the X-ray set under consideration. The Itek microfilm camera described includes both backlighting and top lighting. The backlighting is basically colored green and is diffused having a plurality of controls with settings ranging from a low to high intensity. The top lighting is similarly colored green and is also continuously variable in intensity from a high to a low value. It should also be noted that adjustable slides are maintained for balancing the illumination over a copyboard on which the radiographic set of X-rays are mounted. The photographing step of block 10 incorporates the basic parameters of exposure time, transmitted light intensity and film type as a function of the microfilm camera type being used. Utilization of Itek Model No. 3536 camera in producing negative transparencies for X-ray sets having contrast has developed an empirically derived exposure time of approximately 1.75 seconds with a transmitted light intensity optimization of 15 foot-candles. A single control is used in this Itek camera to control all of the six similar backlighting bulbs illuminating the entire set of X-rays on the camera table. In this way the set of X-rays is illuminated with a constant and equal light intensity without any variations in light intensity dependent upon the contrast of one or more of the X-rays. During exposure, light intensities between 10 and 20 foot-candles and exposure time between 1 and 2 seconds have resulted in acceptable but slightly degraded transparencies from the optimized settings herein described. Although a number of high contrast films have been established to be useful in this step of the method, the photographic film found in the optimization of this step was Kodak S0281 radiographic high contrast film, which is commercially available.

The radiographic set of X-rays mounted on the camera table are illuminated from below by the backlighting bulbs. Light passes from the bulbs through the transparent camera table, through the radiographic set of X-rays, and is imaged in the film plane located above the camera table. Thus, the light source produces a light intensity which starts out being constant and equal, (that is substantially uniform in accordance with conventional camera table techniques) but once being tansmitted through the set of X-rays, the light intensity is no longer constant and equal but dependent upon the set of X-rays through which it has passed. Thus, the light intensity impinging upon the film for photographic purposes is no longer constant and equal.

The reduction photographing to a predetermined contour dimension is a function of the needs for a specific operation. The camera model herein described includes an automatic reduction selector and may be adjusted to give reductions between 16 and 36 power. In the standard size aperture card and frame mounting area, it has been found useful in this method to reduce the set of X-rays by 24 power.

It is believed that in order to explain how a grouping of radiographic X-rays having varying contrast can be backlighted with a single source of light having a substantially uniform brightness and be photographed simultaneously with a single exposure setting it is necessary to refer to the characteristic curve of the negative emulsion.

Such characteristic curves are well known in the art and are obtained by exposing the photographic material to a density scale, measuring the resultant densities produced in the photographic material, and plotting one against the other. This has been found to be a common way of depicting the sensitivity of the photographic materials and is generally provided by film manufacturers for use of their products. Characteristic curves are generally segregated into three separate regions: the toe, the straight line portion and the shoulder. When photographing a scene, it is desirable to adjust the exposure so that the range of illuminations reaching the film are within the straight line portion of the characteristic curve. It is generally known that if the exposure is extended to the toe, small differences in illumination may not produce differences in density in the negative which would be great enough to be visible, thus detail may be lost in the shadow portions of the scene. Similarly, detail may be lost in the lightest areas if the light levels reaching the film were allowed to extend to the shoulder of the curve.

When copying a photograph X-ray, it is common practice to adjust the exposure to the middle of the linear or straight line region of the curve so that photos which have a high overall density can be made lighter in the copying, or that "light" photos can be made denser. This is done usually to produce a more attractive picture that is neither too dark nor too light. However, this readjustment in total overall density can in no way bring out details that were not present in the original and may in fact result in loss of detail. In such cases, an original that might be "objectionably" light will often contain some detail in a dense area and this detail will be lost if the copy is made denser overall by adjustment of the exposure. In a similar way, detail can be lost in the light regions of an original which esthetically may be deemed too dense.

This overall shifting of the density of a photograph during copying cannot be justified in an application such as the faithful copying of X-rays. It is believed that the process herein described strives to reproduce in the copy the densities present in the original. Thus, X-rays which are light in the original remain light in the microfilm copy, but no detail is lost due to the fact that the densities present in the original, even though light, are still within the straight line portion of the characteristic curve. Similarly, dense X-rays will remain dense in the microfilm copy, but will have the same detail as the original.

Thus, if light or dense X-rays can be copied individually in such a way that their original densities are reproduced in the microfilm copy with no loss in detail due to shifting a portion of the original onto the toe or shoulder regions of the characteristic curve, the problem of simultaneously photographing several such X-rays with a single exposure and with the same lighting is negated.

In order to insure that the processing takes place entirely within the straight line portion of the characteristic curve so that no detail is lost, it is believed that the process as herein described adjusts the development time for an optimum slope of the straight line section of the characteristic curve to a value of less than unity. This may be necessary due to the fact that the total range of densities present in the X-rays is slightly greater than the range of densities obtainable within the microfilm. Having a slope less than unity dictates that the densities on the X-rays will not be exactly duplicated on the microfilm and that there would be a slight compression of the densities.

In summary, the photographing step in forming an acceptable microfilm includes optimizing the images of the X-rays as a negative transparency on the photographic film. The microfilm camera described may be an Itek Model No. 3536 or some like apparatus having a transmitted light intensity of 15 foot-candles and an exposure time of 1.75 seconds. Kodak S0281 radiographic high contrast photographic film has been used in combination with the other basic parameters to achieve the desired results. Although, not relating to the basic inventive concept herein involved, a reduction ratio in the order of 24 power has resulted in adequate resolution when viewing the set of X-rays when mounted in a frame of an aperture card.

After photographing the set of radiographic X-rays, the film is processed to yield a reversal or negative transparency. The processing step is shown in the figure as the dotted block 20 encompassing individual blocks 30 through 60. As a first step in processing, the photographic film is taken from the microfilm camera and immersed in a high contrast developing solution as characterized by block 30. In this stage of processing, the latent image on the photographic film is transferred into a visible image. This conversion is formed by selective reduction into metallic silver of the crystals which are included in the emulsion which forms the latent image. Developing agents are those substances which selectively reduce the included crystals into metallic silver. The block 30 step uses an Itek 21-41 developer solution which is commercially available. However, the solution temperature has been found critical in the forming of an optimized visible image. The acceptable temperature range of 80° – 84°F. with a desired temperature of 82°F. and an immersion time approximately 13.6 seconds has been found to give the best results. The criticality of the acceptable temperature range for the developing solution is emphasized by the fact the recommended solution temperature is generally recognized to be 68° – 70°F., the necessary temperature in the subject process being well out of the suggested range.

The next consecutive step within processing dotted block 20 is bathing the film in an initial water bath as shown in block 40. Immersion of the film in the water solution is maintained for approximately 13±1 seconds as, for example, 13.6 seconds and the bath is held at a constant 69°F. temperature reading.

After the initial water bath immersion, the photographic film is passed to the fixation process, block 50. The film is taken from the water bath and placed in the fixing solution where the silver salts are removed from the film. This is an essential step in the processing since the salts if allowed to remain in the film would turn the negative black upon exposure to any light source. Fixing agents used in the subject invention include sodium and ammonium thiosulfate; however, other agents may possibly be used such as lithium, guadine thiosulfate, potassium cyanide, thiourea, potassium and ammonium thiocyanate.

Where the fraction of silver halide dissolved is plotted against a time variable, it appears to form an elongated S-curve having a linear gradient in the midportion. Where earlier stages in the step are disregarded, it is seen that the amount of silver halide dissolved is basically linearly proportional to the amount remaining in the film. From this, it has been found that the amount of halide dissolved may be written in the differential form:

$$dH/d\phi = K(a - H) \qquad (1)$$

where:
$H$ = Halide dissolved in time
$\phi$ = Time
$K$ = Rate factor
$a$ = Initial concentration of halide Solution of Eq. 1 yields the amount of halide dissolved in any time to be:

$$H = e^{-K\phi} + a \qquad (2)$$

In the subject method invention, utilizing the film herein described, it has been found that maintaining the film in the fixer bath for 13.6 seconds at a temperature of approximately 67°F. has removed a sufficient amount of halide salts to accomplish the desired results.

After completion of the fixing bath step, the film passes to a final water bath as shown in block 60. The water bath solution is maintained substantially constant at a temperature of 69°F. for a time duration approximately 13.6 seconds. This washing step removes any of the soluble silver thiosulfate compounds, possible hypo or other substances which may have been present in the fixing bath of block 50. The importance of Equations 1 and 2 is shown in the fact that if fixing is incomplete, no amount of final washing will make the image a permanent one since insoluble silver thiosulfate complexes will discolor as a function of increasing time. Where insufficient final washing in block 60 is found, hypo will eventually form, in combination with the silver present, a brownish yellow silver halide.

Once the microfilm has passed through the final water bath as expressed by block 60, the microfilm is then dried as characterized in block 70. The object of this step in the general processing procedure of block 20, is to bring the gelatin layer of the film to the point where it is in equilibrium with the relative humidity of the ambient environment where the negative transparency is to be handled and stored. In the drying step, air is raised to a temperature of approximately 215°F. Heating the air lowers the relative humidity and increases the amount of water which the air may absorb, thus speeding the drying step. However, where the relative humidity of the heated air is too low, the surface of the emulsion layer may dry faster than the interior which may set up stress loads in the gelatin layer and have the tendency of increasing the graininess of the image. The drying step of block 70 may include a variety of known drying apparatus including use of a drying cabinet in combination with electrical heating units, baffles and fans to distribute the heated air evenly throughout the cabinet. Other such apparatus, not important to the inventive concept, may include infrared lamps or other such means for elevating the drying air.

Referring now to the figure, when the drying step of block 70 has been completed, the initial processing procedure of block 20 has been accomplished. At this stage of the method, a microfilm negative or negative transparency of the original set of radiographic X-rays are completed. At this point, it is decided whether a positive transparency is to be made before cutting the film to proper size in block 150 and final mounting of the film on an aperture card in block 160. The decision of whether to form a positive transparency before positioning of the film on the aperture card, blocks 150,160 is a function of the operator's use and custom. In the United States, it is generally accepted that a positive transparency be made; however, in some foreign countries this method is not followed.

Assuming a decision for making a positive transparency is made as shown in block 80, the negative transparency is passed into a standard contact printer. A contact print is made in block 90 by exposing a strip of unexposed film to the negative transparency of the microfilm. The two films are in direct contact with each other with the emulsion surface of one contiguous with the emulsion surface of the other. In this manner, a positive transparency print is formulated in block 90.

In the subject method, an Itek Model No 303 contact film printer is used for contact printing between the aforementioned films. During the contact printing step, the printing slot is maintained at substantially 0.15 inch opening width, with a film passage speed of 75 feet per minute. Light intensity is maintained at or near 625 foot-candles by using a high intensity quartz-iodine lamp, easily installed in the commercial contact printer herein described.

The Itek Model No. 303 contact printer reproduces with extremely high resolution. In order to accomplish this, the film drive utilizes a constant tension takeup on the positive and negative spindles independent of the length of film being reproduced. Film used to form the positive transparency print has been utilized in a number of commercially sold brands; however, Kodak 5464 slow, high contrast 35 mm. film has been found to optimize the image transfer needed in the method.

Having passed through the contact printing step of block 90, positive transparency enters processing step block 100. The internal steps for processing include developing, block 110, fixation bath block 120, water bath block 130 and finally drying within block 140. Blocks 110, 120 and 130 include steps wherein a standard processor may be used such as Itek Model No. 335 Transflo Film Processor. In this processor, the positive transparency film is buoyantly passed through each bath or processing station. Solutions are applied to opposing film surfaces simultaneously which allows film processing whether the film emulsion is face up or down.

As a first step in the processing of the positive transparency print, the film is taken from the contact printer and immersed in a high contrast developing solution as represented by internal block 110. The developing solution at this step is Itek 21-41 developer solution identical to that described for block 30. In this step, however, the developing solution is maintained at approximately 90°F. temperature with a film incorporation time substantially equal to 7 seconds. The film then passes to a fixer bath similar in chemical composition to those described in block 50 but maintained in block 120 for a time duration of 7 seconds at a temperature approximately 90°F. as opposed to a temperature of 67°F. for 13.6 seconds as was described for block 50 step.

A final water bath washes the positive transparency as shown in block 130 which has the function of removing any of the unwanted compounds which may have been present in the fixing bath of block 120. The water bath has been found to give optimum results when maintained at a temperature of 90°F. for 7 seconds of film immersion. In similar fashion to the drying process of block 70, the positive transparency print is dried in air at a temperature of approximately 185°F. as shown in block 140. Having passed through blocks 90–140 consecutively, the positive transparency pring has been processed and is completed and ready for positioning within openings of an aperture card.

After processing the film, whether at the completion of processing blocks 20 or 100, a plurality of 35mm. frames containing images of more than one X-ray per frame are placed in an aperture card. These steps are represented by blocks 150 and 170 where the film is cut to size to fit predetermined contour openings in an aperture card. Mounting of the film may be accomplished through adhesive or some like means to allow ease of viewing.

In the manner described, using a 24 power reduction of an original set of radiographic X-rays having varying contrast, four 14×17 inch X-ray images are photographed on a single frame. The 14×17 inch X-ray size being the maximum standard medical contour dimension provides for at least 12 X-ray images mounted on a single aperture card. The aperture card in itself may come in a variety of standard sizes, the most common of which is the IBM card size having an outer rectangular contour dimension substantially equal to 7.34×3.25 inches. Generally speaking, the aperture or opening within the card, where the microfilm is mounted, is of sufficient dimensions to allow at least three frames of 35mm. film to be positioned therein. In most instances, the rectangular aperture dimensions approximate 1×6 inches in order to provide adequate mounting surface on the card and permit record files or other pertinent data to be imprinted thereon.

In addition to the mounting of the aforementioned film in an aperture card as described, the film may be inserted loosely within a two channel tab size jacket of size sufficient for the mounting of standard 35mm. film. The jacket comprises an optically clear envelope of plastic sheet having open ends for receiving the film. The sheet plastic is longitudinally bonded together to form two individual compartments for the mounting process.

What is claimed is:
1. A method of photographing a set of radiographic X-rays with at least one of said X-rays having varying contrast with respect to others of said X-rays, to be viewed on one frame of microfilm inserted into an aperture card, comprising the steps of:
   a. illuminating said set of radiographic X-rays with a constant and equal light intensity for the entire set of radiographic X-rays without any light intensity variation dependent upon the contrast of said X-rays, the light intensity starting out constant and equal but once transmitted through said set of X-rays the light intensity is no longer constant and equal;
   b. microfilming said set of illuminated radiographic X-rays at a predetermined single exposure setting to produce a frame of radiographic X-ray microfilm, said microfilming to include photographing said set of illuminated radiographic X-rays with said light intensity having started out constant and equal but once transmitted through said set of X-rays said light intensity no longer being constant and equal for a predetermined exposure time in a predetermined reduced contour dimension on said frame of microfilm for producing a set of radiographic X-ray images exposed thereon; and,
   c. positioning said frame of X-ray microfilm, after development thereof, on said aperture card.

2. The method as recited in claim 1 wherein the step of microfilming is followed by the step of:
   processing said microfilm for producing a reversal thereof said processing to include as a first step immersing said film within a high contrast developing solution, said developing solution maintained substantially at a temperature of 82°F.

3. The method as recited in claim 2 wherein the step of processing said film after immersing said film in said developing solution includes the steps of:
   a. bathing said film in an initial water solution maintained substantially at a temperature of 69°F.,
   b. placing said film in a fixer bath having a predetermined controlled temperature,
   c. introducing said film into a final water solution bath maintained at a temperature substantially equal to said initial water solution bath, and
   drying said film at a predetermined temperature of 215°F.

4. The method as recited in claim 1 wherein the step of positioning said frame of X-ray microfilm includes the steps of:
   a. cutting said frame of X-ray microfilm to a predetermined contour outline; and,
   b. mounting said frame of X-ray microfilm within an opening of said aperture card for viewing.

5. A method of producing a multiplicity of X-ray images on one frame of microfilm adapted for viewing from a set of varying contrast radiographic X-rays, comprising the steps of:
   a. illuminating said set of radiographic X-rays with a constant and equal intensity light source for the entire set of said radiographic X-rays to be photographed on said frame of microfilm without any light intensity variation dependent upon the contrast of said X-rays, the light intensity starting out constant and equal but once transmitted through said set of X-rays the light intensity is no longer constant and equal;

b. microfilming said set of varying contrast radiographic X-rays with said light intensity starting out constant and equal but once transmitted through said set of X-rays, said light intensity no longer being constant and equal for a predetermined exposure time interval for producing a radiographic X-ray microfilm;

c. contact printing said radiographic X-ray microfilm for establishing a positive transparency print of said microfilm;

d. producing a positive transparency of said X-ray microfilm; and, e. locating said positive transparency of a frame of said X-ray microfilm within an opening of an aperture card.

6. The method as recited in claim 5 wherein the step of microfilming includes the step of forming a set of images of said radiographic X-rays on a single frame of microfilm, said images being reduced in contour dimension from said set of radiographic X-rays.

7. The method as recited in claim 6 wherein the step of forming a set of images of said X-rays includes the steps of:

a. passing light through said film having an initial intensity substantially equal to 15 foot-candles, and b. exposing said microfilm to said light for substantially 1.75 seconds for each of said radiographic X-ray images being exposed.

8. The method as recited in claim 6 wherein the step of forming a set of images of said radiographic X-rays includes the steps of:

immersing said film within a high contrast developing solution, said developing solution maintained substantially at a temperature of 82°F., placing said film within a plurality of bathing solutions consecutively for approximately 13±1 seconds, and c. drying said film at a predetermined temperature.

9 The method as recited in claim 8 wherein the step of placing said film in said bathing solutions includes the steps of:

a. bathing said film in an initial water solution maintained substantially at a temperature of 69°F., b. incorporating said film into a fixer bath having a controlled temperature substantially equal to 67°F., and introducing said film strip into a final water solution bath maintained at a temperature substantially equal to said initial water bath solution.

10. The method as recited in claim 5 wherein the step of contact printing includes the steps of:

a. mating an unexposed film strip to said microfilm, b. traversing said mated film strip through a contact printer approximating a speed of 75 feet per minute, and c. transmitting light through said mated film within said contact printer, said light having an initial intensity approximating 625 foot-candles, said unexposed film forming a positive transparency print of said microfilm.

11. The method as recited in claim 5 wherein the step of producing a positive transparency of said X-ray microfilm includes the steps of:

a. immersing said positive transparency print of said microfilm within a consecutive series of baths, each of said baths maintained at a temperature approximating 90°F., said immersion for a time substantially equal to 7 seconds, and b. drying said positive transparency print at a temperature substantially equal to 185°F.

12. The method as recited in claim 11 wherein the step of immersing said positive transparency print includes the steps of:

a. bathing said positive transparency print in a high contrast developing solution, b. placing said positive transparency print in a fixer solution, and c. incorporating said positive transparency print into a water solution bath.

13. The method as recited in claim 5 wherein the step of locating said positive transparency includes the steps of a. cutting said positive transparency to a predetermined outline, and b. mounting said positive transparency on said frame of said aperture card for viewing.

14. A method of making an aperture card with a frame of X-ray microfilm which includes the steps of:

a. positioning a plurality of radiographic X-rays on a copy board associated with a microfilm camera to form a set of radiographic X-rays where at least one of said X-rays has varying contrast with respect to others of said X-ray set;

b. illuminating said set of X-rays with a constant and equal intensity light source for the entire set of X-rays to be photographed on one frame of microfilm without any light intensity variation dependent upon the contrast of said X-rays, the light intensity starting out constant and equal but once transmitted through said set of X-rays the light intensity is no longer constant and equal;

c. microfilming said set of X-rays with said light intensity starting out constant and equal but once transmitted through said set of X-rays the light intensity no longer being constant and equal for a predetermined exposure time interval to produce a radiographic X-ray microfilm, said microfilming to include photographing said set of radiographic X-rays on said frame of microfilm and, d. mounting said frame of X-ray microfilm, after development thereof, within an opening of an aperture card.

15. The method as recited in claim 14 where the step of positioning includes sequencing said varying contrast radiographic X-rays in a desired order for being photographed on said frame of photographic film, said ordering taken irrespective of said varying contrast between said radiographic X-rays.

* * * * *